(12) United States Patent
Mori et al.

(10) Patent No.: US 8,144,085 B2
(45) Date of Patent: Mar. 27, 2012

(54) DISPLAY DEVICE, CONTROL METHOD AND COMPUTER PROGRAM FOR DISPLAY DEVICE

(75) Inventors: Hideto Mori, Kanagawa (JP); Ken Kikuchi, Tokyo (JP); Yasuo Inoue, Tokyo (JP); Takeya Meguro, Tokyo (JP); Hidehiko Shidara, Tokyo (JP); Masahiro Ito, Kanagawa (JP); Toyo Osumi, Aichi (JP)

(73) Assignee: Sony Corporation, Tokyo (JP)

( * ) Notice: Subject to any disclaimer, the term of this patent is extended or adjusted under 35 U.S.C. 154(b) by 986 days.

(21) Appl. No.: 12/121,437

(22) Filed: May 15, 2008

(65) Prior Publication Data

US 2008/0284767 A1    Nov. 20, 2008

(30) Foreign Application Priority Data

May 18, 2007   (JP) ................................ 2007-133229

(51) Int. Cl.
    *G09G 3/30*   (2006.01)
(52) U.S. Cl. ............. 345/77; 345/690; 345/204; 345/83
(58) Field of Classification Search .............. 345/76–83, 345/204, 207, 690, 691; 315/169.3; 313/463; 348/223.1; 382/162, 167
See application file for complete search history.

(56) References Cited

U.S. PATENT DOCUMENTS

| | | | | |
|---|---|---|---|---|
| 6,072,526 A * | 6/2000 | Hashimoto et al. | ........ | 348/223.1 |
| 6,650,365 B1 * | 11/2003 | Sato | ............................ | 348/231.3 |
| 6,710,757 B2 * | 3/2004 | Wu | ................................. | 345/76 |
| 6,947,080 B2 * | 9/2005 | Ikeda | ......................... | 348/223.1 |
| 7,446,779 B2 * | 11/2008 | Ikeda et al. | .................... | 345/589 |
| 7,564,438 B2 * | 7/2009 | Kao et al. | ......................... | 345/89 |
| 7,652,432 B2 * | 1/2010 | Hara et al. | ................. | 315/169.3 |
| 7,834,825 B2 * | 11/2010 | Mizukoshi et al. | ............. | 345/77 |
| 7,907,135 B2 * | 3/2011 | Kuwabara et al. | ............. | 345/207 |
| 2005/0218295 A1 * | 10/2005 | Nakamura et al. | ......... | 250/208.1 |
| 2006/0214940 A1 * | 9/2006 | Kinoshita et al. | ............. | 345/589 |
| 2007/0200803 A1 * | 8/2007 | Kimura | .......................... | 345/76 |

FOREIGN PATENT DOCUMENTS

JP      2005-084335      3/2005
WO    WO2006103862    * 10/2006

* cited by examiner

*Primary Examiner* — Lun-Yi Lao
*Assistant Examiner* — Tom Sheng
(74) *Attorney, Agent, or Firm* — SNR Denton US LLP

(57) ABSTRACT

A display device includes: a light emission amount detecting section which inputs video signals having linear property and detects an amount of light emission from the video signals; a light emitting time calculating section which calculates light emitting time of the light emitting elements based on the amount of light emission detected by the light emission amount detecting section; a light emitting time recording section which records the calculated light emitting time; a luminance acquiring section which, acquires luminance information of the light emitting elements using the light emitting time recorded in the light emitting time recording section; a coefficient calculating section which calculates coefficients by which the video signals are multiplied based on the luminance information acquired by the luminance acquiring section; and a coefficient multiplying section which multiplies the video signals by the coefficients calculated by the coefficient calculating section.

8 Claims, 11 Drawing Sheets

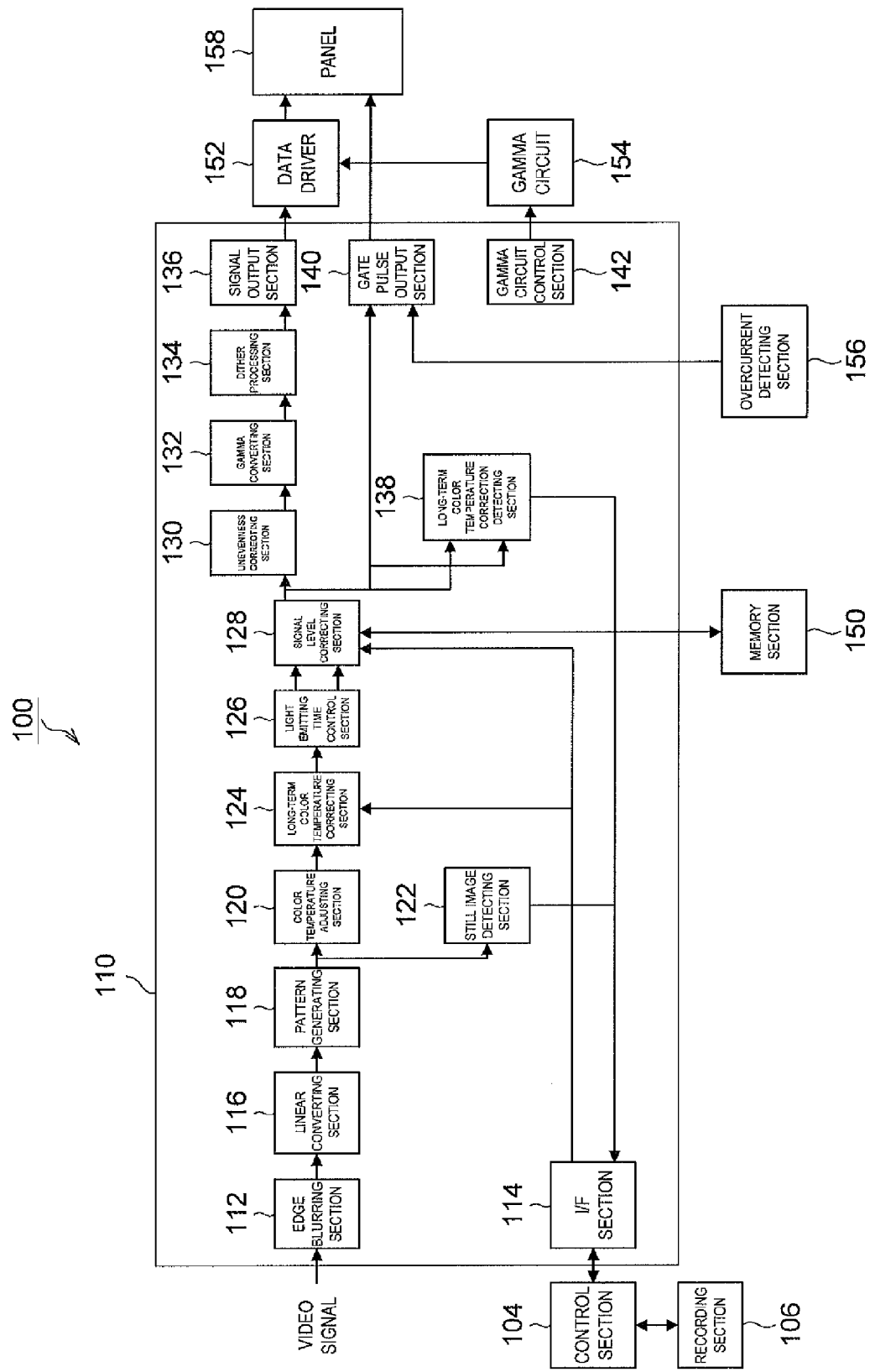

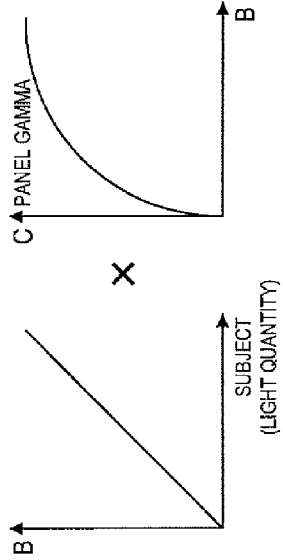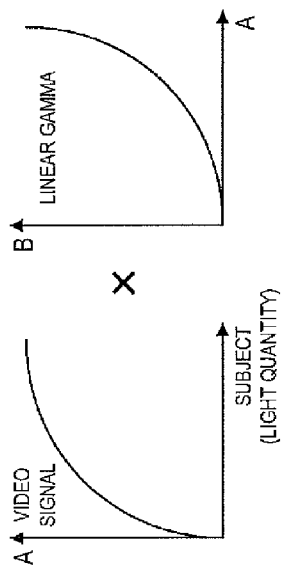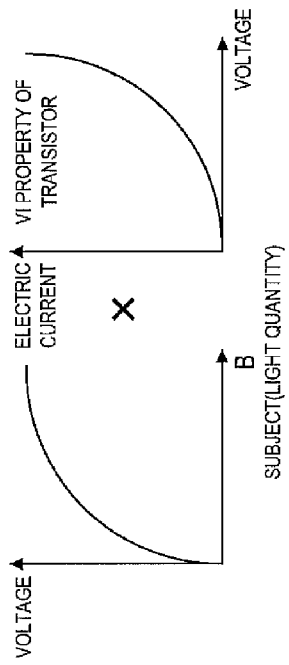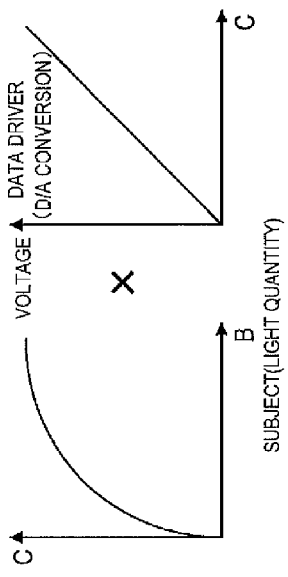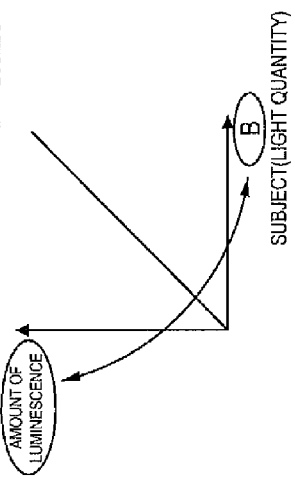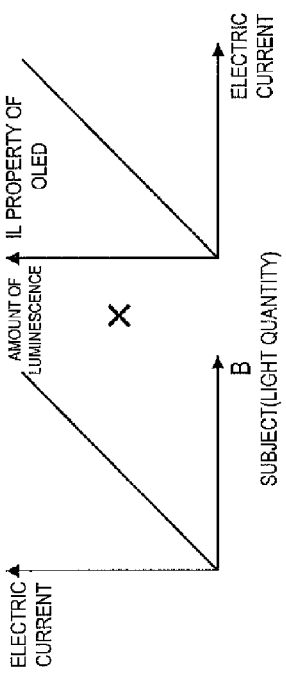

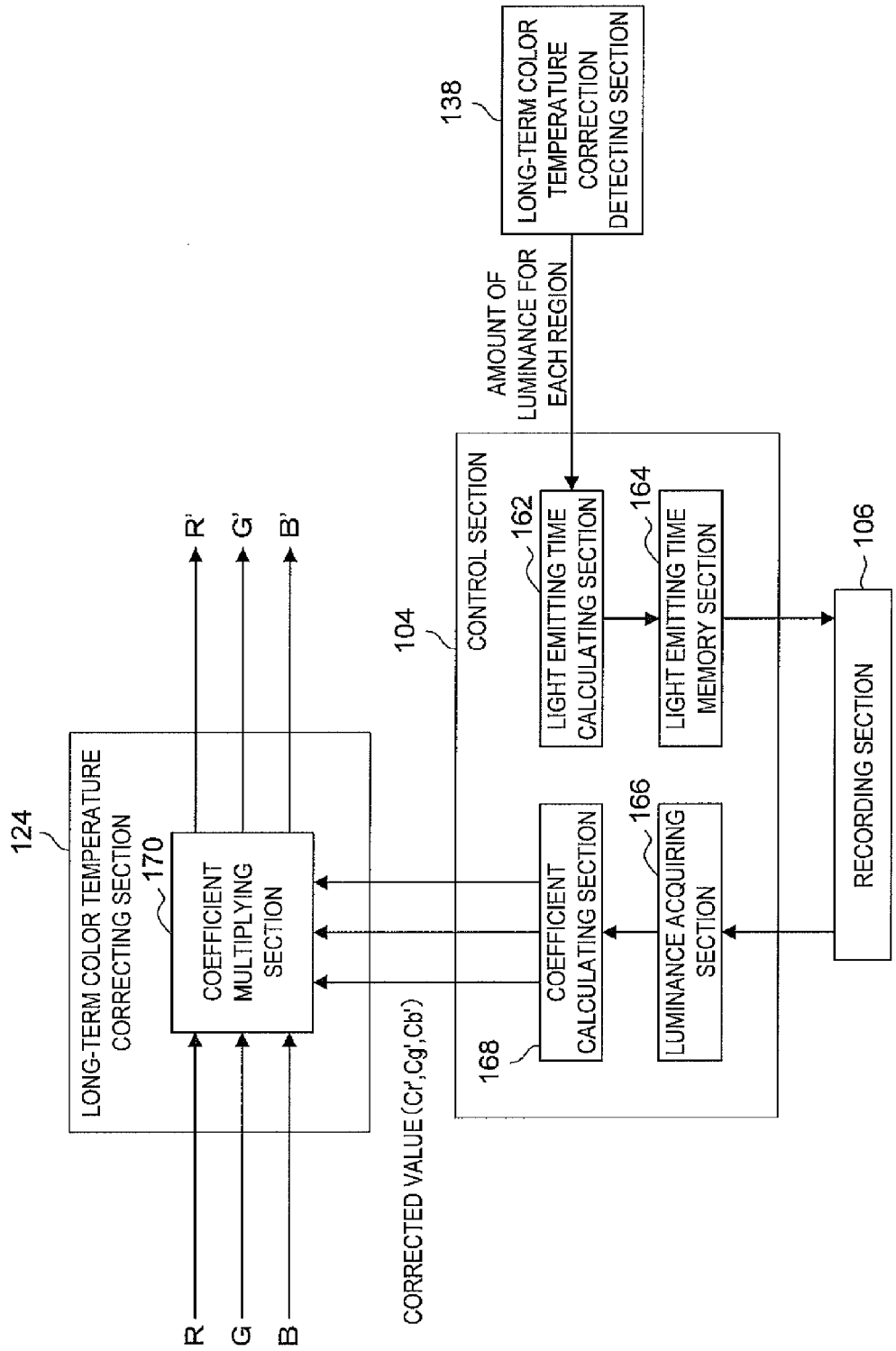

DISPLAY DEVICE, CONTROL METHOD AND COMPUTER PROGRAM FOR DISPLAY DEVICE

CROSS-REFERENCE TO RELATED APPLICATION

The present invention contains subject matter related to Japanese Patent Application JP 2007-133229 filed in the Japan Patent Office on May 18, 2007, the entire contents of which being incorporated herein by reference.

BACKGROUND OF THE INVENTION

1. Field of the Invention

The present invention relates to a display device and a control method for display device. More specifically, the invention relates to the active matrix type display device where scanning lines for selecting pixels in a predetermined scanning cycle, data lines for giving luminance information for driving the pixels, and pixel circuits for controlling a current amount based on the luminance information and allowing light emitting elements to emit light according to the current amount are arranged into a matrix pattern, and the control method for the display device.

2. Description of the Related Art

As flat and thin display devices, liquid crystal display devices using liquid crystal and plasma display devices using plasma have been coming into practical use.

Liquid crystal display devices are provided with backlight, change an arrangement of liquid crystal molecules by means of application of a voltage, and allow light from the backlight to be transmitted or cut off so as to display images. Plasma display devices apply a voltage to gas sealed into a substrate so as to be brought into a plasma state, and emit ultraviolet rays generated due to an energy generated at the time of returning from the plasma state to an original state to a fluorescence substance so as to obtain a visible light and display images.

On the other hand, in recent years, self-light emitting type display devices which use organic EL (electroluminescence) elements which emit light by application of a voltage are being developed. When organic EL elements receive energy due to electrolyzation, their ground state is changed into an excited state, and when the organic EL elements are returned from the excited state into the ground state, a differential energy is radiated as light. Organic EL display devices display images using the light radiated from the organic EL elements.

Self-light emitting display devices do not use backlight because the elements emit light by themselves differently from the liquid crystal display devices which use backlight. For this reason, the self-light emitting display devices can be made to be thinner than the liquid crystal display devices. Further, moving image property, view angle property and color reproducing property of the self-light emitting display devices are more excellent than those of the liquid crystal displays. For this reason, the self-light emitting display devices using the organic EL elements attract attention as next-generation flat thin display devices. For example, Japanese Patent Application Laid-Open No. 2005-84335 discloses such self-light emitting display devices using the organic EL elements.

SUMMARY OF THE INVENTION

However, since the elements emit light by themselves in the self-light emitting display devices, the light emitting elements are deteriorated due to the continuous light emission. The light emitting elements of three primary colors including red, green and blue have various degradation characters, respectively. Therefore, a light emission balance among red, green and blue is disrupted according to the deterioration of the light emitting elements, and thus an image whose color temperature is different from a desired one is displayed on a screen.

Therefore, it is desirable to provide a new and improved display device which calculates light emitting time from a video signal and acquires luminance of light emitting elements based on the calculated light emitting time so as to be capable of correcting color temperature based on the acquired luminance information, and a control method for the display device and a computer program.

According to an embodiment of the present invention, there is provided a display device which has a display section in which pixels which have light emitting elements for emitting light by themselves according to a current amount and pixel circuits for controlling an electric current applied to the light emitting elements according to video signals, scanning lines which supply selection signals for selecting the pixels for emitting light to the pixels in a predetermined scanning cycle, and data lines which supply the video signals to the pixels are arranged into a matrix pattern, including: a light emission amount detecting section which inputs video signals having linear property and detects an amount of light emission from the video signals; a light emitting time calculating section which calculates light emitting time of the light emitting elements based on the amount of light emission detected by the light emission amount detecting section; a light emitting time recording section which records the calculated light emitting time; a luminance acquiring section which acquires luminance information of the light emitting elements using the light emitting time recorded in the light emitting time recording section; a coefficient calculating section which calculates coefficients by which the video signals are multiplied based on the luminance information acquired by the luminance acquiring section; and a coefficient multiplying section which multiplies the video signals by the coefficients calculated by the coefficient calculating section.

According to such a constitution, the light emission amount detecting section inputs the video signals having linear property, and detects the amount of light emission from the video signals. The light emitting time calculating section calculates light emitting time of the light emitting elements based on the amount of light emission detected by the light emission amount detecting section. The light emitting time recording section records the calculated light emitting time, and the luminance acquiring section acquires luminance information of the light emitting elements using the light emitting time recorded in the light emitting time recording section. The coefficient calculating section calculates coefficients by which the video signals are multiplied based on the luminance information acquired by the luminance acquiring section. The coefficient multiplying section multiplies the video signals by the coefficients calculated by the coefficient calculating section. As a result, the light emitting time is calculated from the video signals, the luminance of the light emitting elements is acquired from the calculated light emitting time, and the coefficients are calculated based on the information about the acquired luminance. The video signals are multiplied by the calculated coefficients so that color temperature of a video displayed on the screen can be corrected.

The display device may further include a linear converting section which converts video signals having gamma property into video signals having linear property. According to this constitution, the linear converting section converts the video signals having gamma property into video signals having linear property. The video signals having linear property converted by the linear converting section are input into the light emission amount detecting section, and the amount of light emission is detected from the video signals. As a result, the various signal processes can be easily executed on the video signals.

The display device may further include a gamma converting section which converts output signals having linear property in the coefficient multiplying section into signals having gamma property. According to this constitution, the gamma converting section converts output signals having linear property in the coefficient multiplying section into signals having gamma property. As a result, since the video signals have gamma property, the gamma property of the display section is cancelled, and the display section has linear property so that self-light emitting elements in the display section emit light according to electric currents of the signals.

The coefficient calculating section may calculate coefficients for adjusting luminance of the other colors to the lowest luminance of a color as a result of acquiring the luminance information in the luminance acquiring section. According to this constitution, the coefficient calculating section calculates coefficients for adjusting the luminance of the other colors to the lowest luminance of the color as a result of acquiring the luminance information in the luminance acquiring section. As a result, since the luminance is reduced so that the luminance of the other colors is adjusted to the lowest luminance of that color and a video is displayed, a deteriorating speed of the self-light emitting elements can be slowed.

The light emission amount detecting section detects the amount of light emission in the plurality of regions on the screen, and the signal level correcting section may correct the amount of light emission according to a region where the luminance is the lowest. According to this constitution, the light emission amount detecting section detects the amount of light emission in the plurality of regions on the screen, and the signal level correcting section corrects the amount of light emission according to a region where the luminance is the lowest. As a result, the luminance on the entire screen is adjusted to the lowest luminance, the color temperature on the entire screen can be adjusted.

The light emission amount detecting section may move the plurality of regions on the screen up and down so as to detect the amount of light emission. According to this constitution, the light emission amount detecting section moves the plurality of regions on the screen up and down so as to detect the amount of light emission. As a result, the luminance on the screen can be detected uniformly, and the color temperature can be corrected more effectively.

According to another embodiment of the present invention, there is provided a control method for display device, the display device having a display section in which pixels which have light emitting elements for emitting light by themselves according to a current amount and pixel circuits for controlling an electric current applied to the light emitting elements according to video signals, scanning lines which supply selection signals for selecting the pixels for emitting light to the pixels in a predetermined scanning cycle, and data lines which supply the video signals to the pixels are arranged into a matrix pattern, including the steps of: inputting video signals having linear property and detecting an amount of light emission; calculating light emitting time based on the amount of light emission detected at the light emission amount detecting step; recording the calculated light emitting time; acquiring luminance of the light emitting elements based on a relationship between the light emitting time recorded at the light emitting time recording step and the luminance of the light emitting elements; calculating coefficients by which the video signals are multiplied based on the luminance information acquired at the luminance acquiring step; and multiplying the video signals by the coefficients calculated at the coefficient calculating step.

According to this constitution, the video signals having linear property are input and the amount of light emission is detected at the light emission amount detecting step. At the light emitting time calculating step, the light emitting time is calculated based on the amount of light emission detected at the light emission amount detecting step. At the light emitting time recording step, the calculated light emitting time is recorded. At the luminance acquiring step, the luminance of the light emitting elements are acquired based on the relationship between the light emitting time recorded at the light emitting time recording step and the luminance of the light emitting elements. At the coefficient calculating step, the coefficients by which the video signals are multiplied are calculated based on the luminance information acquired at the luminance acquiring step. At the coefficient multiplying step, the video signals are multiplied by the calculated coefficients. As a result, the light emitting time is calculated from the video signals, the luminance of the light emitting elements is acquired from the calculated light emitting time, and the coefficients are calculated based on the acquired luminance information. The video signals are multiplied by the calculated coefficients, so that the color temperature of an image displayed on the screen can be corrected.

According to another embodiment of the present invention, there is provide a computer program which allows a computer to control a display device having a display section in which pixels which have light emitting elements for emitting light by themselves according to a current amount and pixel circuits for controlling an electric current applied to the light emitting elements according to video signals, scanning lines which supply selection signals for selecting the pixels for emitting light to the pixels in a predetermined scanning cycle, and data lines which supply the video signals to the pixels are arranged into a matrix pattern, including the steps of: inputting video signals having linear property and detecting an amount of light emission; calculating light emitting time based on the amount of light emission detected at the light emission amount detecting step; recording the calculated light emitting time; acquiring luminance of the light emitting elements based on a relationship between the light emitting time recorded at the light emitting time recording step and the luminance of the light emitting elements; calculating coefficients by which the video signals are multiplied based on the luminance information acquired at the luminance acquiring step; and multiplying the video signals by the coefficients calculated at the coefficient calculating step.

According to this constitution, at the light emission amount detecting step, the video signals having linear property are input and the amount of light emission is detected. At the light emitting time calculating step, the light emitting time is calculated based on the amount of light emission detected at the light emission amount detecting step. At the light emitting time recording step, the calculated light emitting time is recorded. At the luminance acquiring step, the luminance of the light emitting elements are acquired based on the relationship between the light emitting time recorded at the light emitting time recording step and the luminance of the light emitting elements. At the coefficient calculating step, the coefficients by which the video signals are multiplied are calculated based on the luminance information acquired at the luminance acquiring step. At the coefficient multiplying step, the video signals are multiplied by the calculated coefficients. As a result, the light emitting time is calculated from the video signals, the luminance of the light emitting elements is acquired from the calculated light emitting time, and the coefficients are calculated based on the acquired luminance information. The video signals are multiplied by the calculated coefficients, so that the color temperature of an image displayed on the screen can be corrected.

According to the embodiments of the present invention described above, there is provided the new and improved display device which calculates light emitting time from video signals so as to be capable of correcting color temperature based on the light emitting time and information about luminance of light emitting elements, a control method for display device and a computer program.

BRIEF DESCRIPTION OF THE DRAWINGS

FIG. 1 is an explanatory diagram explaining a constitution of a display device 100 according to one embodiment of the present invention;

FIG. 2A is an explanatory diagram explaining a property transition of a signal flowing in the display device 100 according to one embodiment of the present invention using a graph;

FIG. 2B is an explanatory diagram explaining a property transition of the signal flowing in the display device 100 according to one embodiment of the present invention using a graph;

FIG. 2C is an explanatory diagram explaining a property transition of the signal flowing in the display device 100 according to one embodiment of the present invention using a graph;

FIG. 2D is an explanatory diagram explaining a property transition of the signal flowing in the display device 100 according to one embodiment of the present invention using a graph;

FIG. 2E is an explanatory diagram explaining a property transition of the signal flowing in the display device 100 according to one embodiment of the present invention using a graph;

FIG. 2F is an explanatory diagram explaining a property transition of the signal flowing in the display device 100 according to one embodiment of the present invention using a graph;

FIG. 3 is an explanatory diagram explaining a long-term color temperature correcting section 124 and structural components relating to the long-term color temperature correcting section 124;

DETAILED DESCRIPTION OF THE PREFERRED EMBODIMENTS

Figure 4:
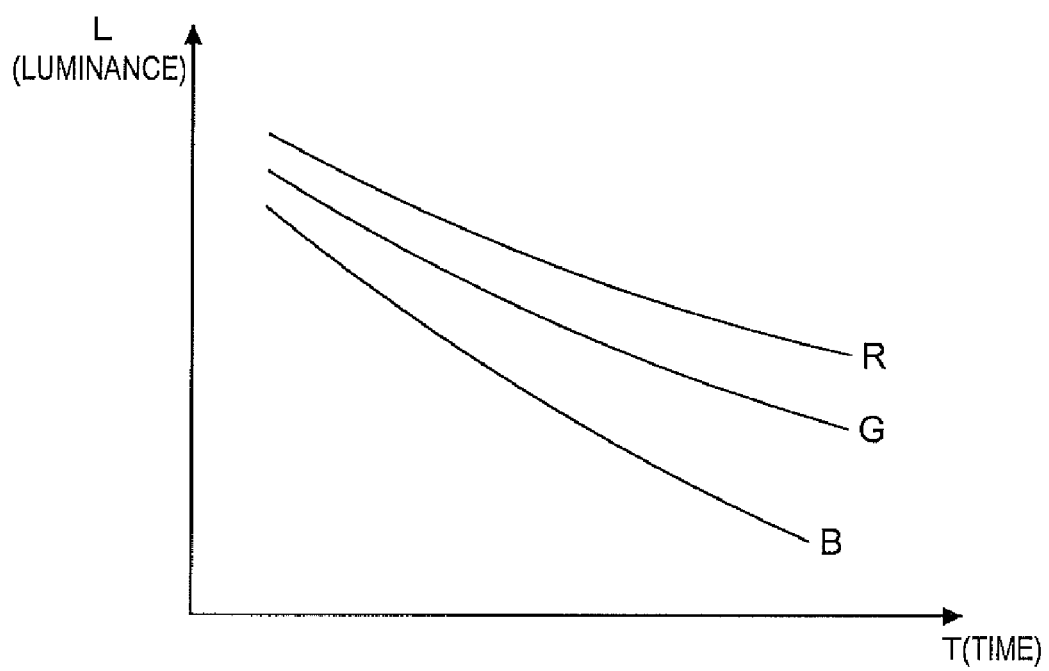
FIG. 4 is an explanatory diagram explaining one example of an LT property of an organic EL element.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

FIG. 1 is an explanatory diagram explaining a constitution of a display device 100 according to one embodiment of the present invention. The constitution of the display device 100 according to one embodiment of the present invention is described below with reference to FIG. 1.

As shown in FIG. 1, the display device 100 according to one embodiment of the present invention includes a control section 104, a recording section 106, a signal processing integrated circuit 110, a memory section 150, a data driver 152, a gamma circuit 154, an overcurrent detecting section 156 and a panel 158.

The signal processing integrated circuit 110 includes an edge blurring section 112, an I/F section 114, a linear converting section 116, a pattern generating section 118, a color temperature adjusting section 120, a still image detecting section 122, a long-term color temperature correcting section 124, a light emitting time control section 126, a signal level correcting section 128, an unevenness correcting section 130, a gamma converting section 132, a dither processing section 134, a signal output section 136, a long-term color temperature correction detecting section 138, a gate pulse output section 140, and a gamma circuit control section 142.

When receiving a video signal, the display device 100 analyzes the video signal, and turns on pixels arranged in the panel 158, mentioned later, according to the analyzed contents, so as to display a video through the panel 158.

The control section 104 controls the signal processing integrated circuit 110 and sends/receives a signal to/from the I/F section 114. The control section 104 executes various signal processes on the signals received from the I/F section 114. The signal processes executed in the control section 104 include, for example, calculation of a gain to be used for adjusting luminance of an image displayed on the panel 158.

The recording section 106 stores information for controlling the signal processing integrated circuit 110 in the control section 104 therein. A memory, which can store information without deletion of the information even if a power of the display device 100 is turned off, is preferably used as the recording section 106. An EEPROM (Electronically Erasable and Programmable Read Only Memory), which can rewrite contents electrically, is desirably used as the memory which is adopted as the recording section 106. The EEPROM is a nonvolatile memory which can write or delete data with the EEPROM being packaged on a substrate, and is suitable for storing information in the display device 100 changing by the minute.

The signal processing integrated circuit 110 inputs a video signal and executes signal processes on the input video signal. In this embodiment, the video signal input into the signal processing integrated circuit 110 is a digital signal, and a signal width is 10 bits. The signal processes to be executed on the input video signal are executed in the respective sections in the signal processing integrated circuit 110.

The edge blurring section 112 executes a signal process for blurring an edge on the input video signal. Concretely, the edge blurring section 112 intentionally shifts an image and blurs its edge so as to prevent a phenomenon of burn-in of the image to the panel 158.

The linear converting section 116 executes a signal process for converting a video signal whose output with respect to an input has a gamma property into a video signal having a linear property. When the linear converting section 116 executes the signal process so that the output with respect to the input has the linear property, various processes on images displayed on the panel 158 become easy. The signal process in the linear converting section 116 widens the signal width of the video signal from 10 bits to 14 bits. When the linear converting section 116 converts the video signal into a video signal having linear property, the gamma converting section 132, mentioned later, converts the video signal having linear property into a video signal having gamma property.

The pattern generating section 118 generates test patterns to be used in the image processes in the display device 100. The test patterns to be used in the image processes in the display device 100 include, for example, a test pattern which is used for display check of the panel 158.

The color temperature adjusting section 120 adjusts color temperature of images, and adjusts colors to be displayed on the panel 158 of the display device 100. Not shown in FIG. 1, but the display device 100 includes a color temperature adjusting unit which adjusts color temperature, and when a user operates the color temperature adjusting unit, color temperature of images to be displayed on the screen can be adjusted manually.

The long-term color temperature correcting section 124 corrects deterioration with age due to variation in luminance-time property (LT property) of respective colors R (red), G (green) and B (blue) of organic EL elements. Since the organic EL elements have different LT properties of respective colors R, G and B, a color balance is deteriorated over light emitting time. The long-term color temperature correcting section 124 corrects the color balance.

The light emitting time control section 126 calculates a duty ratio of a pulse at the time of displaying a video on the panel 158, and controls the light emitting time of the organic EL elements. The display device 100 applies an electric current to the organic EL elements in the panel 158 while the pulse in an HI state, so as to allow the organic EL elements to emit light and displays an image.

The signal level correcting section 128 corrects the level of the video signal and adjusts the luminance of the video to be displayed on the panel 158 in order to prevent an image burn-in phenomenon. The image burn-in phenomenon is a phenomenon that the light emitting property is deterioration which is caused in the case where light emitting frequency of a specified pixel is higher than that of the other pixels. The luminance of the deteriorated pixel is lower than that of the other pixels which are not deteriorated, and a difference in the luminance becomes large between the deteriorated pixel and the peripheral non-deteriorated pixels. Characters are seemed to be burnt in the screen due to the difference in the luminance.

The signal level correcting section 128 calculates the amount of light emission of respective pixels or a pixel group based on the video signal and the duty ratio of the pulse calculated by the light emitting time control section 126, and calculates a gain for reducing the luminance according to need based on the calculated amount of light emission so as to multiply the video signal by the calculated gain.

The long-term color temperature correction detecting section 138 detects information for the correction in the long-term color temperature correcting section 124. The information detected by the long-term color temperature correction detecting section 138 is sent to the control section 140 via the I/F section 114, and is recorded in the recording section 106 via the control section 104.

The unevenness correcting section 130 corrects unevenness of images and videos displayed on the panel 158. The unevenness correcting section 130 corrects horizontal stripes and vertical stripes of the panel 158 and unevenness of the entire screen based on the level of an input signal and a coordinate position.

The gamma converting section 132 executes a signal process for converting the video signal converted into a signal having linear property by the linear converting section 116 into a signal having gamma property. The signal process executed in the gamma converting section 132 is a signal process for canceling the gamma property of the panel 158 and converting a signal into a signal having a linear property so that the organic EL elements in the panel 158 emit light according to the electric current of the signal. When the gamma converting section 132 executes the signal process, the signal width changes from 14 bits into 12 bits.

The dither processing section 134 executes dithering on the signal converted by the gamma converting section 132. The dithering provides display in which displayable colors are combined in order to express medium colors in an environment that the number of usable colors is small. When the dither processing section 134 executes dithering, colors which are not originally displayed on the panel are created apparently so as to be expressed. The signal width is changed from 12 bits into 10 bits by the dithering in the dither processing section 134.

The signal output section 136 outputs the signal which is dithered by the dither processing section 134 to the data driver 152. The signal sent from the signal output section 136 to the data driver 152 is a signal multiplied by information about the amount of light emission of respective colors R, G and B, and the signal multiplied by the information about the light emitting time is output in a form of a pulse from the gate pulse output section 140.

The gate pulse output section 140 outputs a pulse for controlling the light emitting time of the panel 158. The pulse output from the gate pulse output section 140 is a pulse obtained based on the duty ratio calculated by the light emitting time control section 126. The pulse from the gate pulse output section 140 determines the light emitting time of each pixel on the panel 158.

The gamma circuit control section 142 gives a set value to the gamma circuit 154. The set value given from the gamma circuit control section 142 is a reference voltage given to ladder resistance of a D/A converter in the data driver 152.

The memory section 150 stores information about the pixels or a pixel group for emitting light with luminance higher than predetermined value which is necessary at the time when luminance is corrected by the signal level correcting section 128, and information about the luminance higher than the predetermined value. Differently from the recording section 106, a memory from which contents are deleted when the power is turned off may be used as the memory section 150, and for example, SDRAM (Synchronous Dynamic Random Access Memory) is desirably used as such a memory.

The overcurrent detecting section 156 detects an overcurrent which is generated due to short-circuit of a substrate, and posts it to the gate pulse output section 140. The posting of the overcurrent generation from the overcurrent detecting section 156 can prevent overcurrent, if generated, from being applied to the panel 158.

The data driver 152 executes a signal process on the signal received from the signal output section 136, and outputs the signal for displaying a video on the panel 158 to the panel 158. The data driver 152 includes a D/A converter, not shown, and converts a digital signal into an analog signal so as to output the analog signal.

The gamma circuit 154 gives a reference voltage to the ladder resistance of the D/A converter included in the data driver 152. The reference voltage to be given to the ladder resistance is generated by the gamma circuit control section 142 as described above.

The panel 158 inputs an output signal from the data driver 152 and an output pulse from the gate pulse output section 140 therein, and allows the organic EL elements as one example of self-light emitting elements to emit light so as to display a moving image or a still image according to the input signal and pulse. In the panel 158, a surface on which an image is displayed has a plane shape. The organic EL elements are self-light emitting elements which emit light when a voltage is applied, and their amount of light emission is proportional to the voltage. Therefore, an IL property (current—light-emission amount property) of the organic EL elements also has a proportional relationship.

In the panel 158, not shown, scanning lines, data lines and pixel circuits are arranged into a matrix pattern. The scanning lines are used for selecting pixels in a predetermined scanning cycle. The data lines are used for giving luminance information for driving the pixels. The pixel circuits control the amount of electric current based on the luminance information, and allow the organic EL elements as light emitting elements to emit light according to the amount of electric current. The provision of the scanning lines, the data line and the pixel circuits enable the display device 100 to display videos according to the video signals.

The constitution of the display device 100 according to one embodiment of the present invention with reference to FIG. 1 is described above. In the display device 100 according to one embodiment of the present invention shown in FIG. 1, after the linear converting section 116 converts a video signal into a signal having a linear property, inputs the converted video signal into the pattern generating section 118. However, the pattern generating section 118 and the linear converting section 116 may be interchanged.

A property transition of a signal flowing in the display device 100 according to one embodiment of the present invention is described below. FIGS. 2A to 2F are explanatory diagrams explaining property transitions of the signal flowing in the display device 100 according to one embodiment of the present invention using graphs. In the graphs in FIGS. 2A to 2F, an abscissa axis represents input and an ordinate axis represents output.

In FIG. 2A, when a subject is input, the linear converting section 116 multiplies a video signal whose output A with respect to the light quantity of the subject has a gamma property by an inverse gamma curve (linear gamma) so as to convert the video signal into a video signal whose output with respect to the light quantity of the subject has a linear property.

In FIG. 2B, the gamma converting section 132 multiplies a video signal converted so that an output B with respect to the input of the light quantity of the subject has a linear property by a gamma curve, so as to convert the video signal into a video signal whose output with respect to the input of the light quantity of the subject has a gamma property.

In FIG. 2C, the data driver 152 converts a video signal, which is converted so that an output C with respect to the input of the light quantity of the subject has the gamma property, into an analog signal. In the D/A conversion, a relationship between input and output has the linear property. Therefore, the data driver 152 D/A-converts a video signal, and when the light quantity of the subject is input, an output voltage has the gamma property.

In FIG. 2D, when the video signal which was subject to the D/A conversion is input into a transistor included in the panel 158, both gamma properties are cancelled. The VI property of the transistor is the gamma property which has a curve inverse to a gamma property of the output voltage with respect to the input of the light quantity of the subject. Therefore, when the light quantity of the subject is input, the conversion can be again carried out so that the output current has a linear property.

In FIG. 2E, when the light quantity of the subject is input, the signal whose output current has a linear property is input into the panel 158. As a result, the signal having the linear property is multiplied by the IL property of the organic EL elements having the linear property.

As a result, as shown in FIG. 2F, when the light quantity of the subject is input, the amount of light emission of the panel (OLED; Organic Light Emitting Diode) has the linear property. For this reason, the linear converting section 116 multiplies the video signal by an inverse gamma curve and converts the video signal into a video signal having linear property, so that a portion between the linear converting section 116 and the gamma converting section 132 in the signal processing integrated circuit 110 shown in FIG. 1 as a linear region can be subject to the signal processes.

The property transitions of the signals flowing in the display device 100 according to one embodiment of the present invention are described above.

The long-term color temperature correcting section 124 and structural components relating to the long-term color temperature correction section 124 according to one embodiment of the present invention are described below.

FIG. 3 is an explanatory diagram explaining the long-term color temperature correcting section 124 and the structural elements relating to the long-term color temperature correcting section 124 according to one embodiment of the present invention. The long-term color temperature correcting section 124 and the structural elements relating to the long-term color temperature correcting section 124 according to one embodiment of the present invention are described in detail below with reference to FIG. 3.

The long-term color temperature correcting section 124 inputs video signals corresponding to respective colors R, G and B and correction coefficients Cr', Cg' and Cb' sent from the control section 104, and multiplies the video signals corresponding to respective colors R, G and B by gains calculated from the correction coefficients Cr', Cg' and Cb' corresponding to respective colors R, G and B. The long-term color temperature correcting section 124 outputs the video signals (R', G' and B') corresponding to respective colors R, G and B multiplied by the gains.

As shown in FIG. 3, the long-term color temperature correcting section 124 includes a coefficient multiplying section 170. The coefficient multiplying section 170 multiplies the video signals by the correction coefficients Cr', Cg' and Cb' calculated by a coefficient calculating section 168, mentioned later, and outputs the multiplied video signals (R', G' and B') corresponding to respective colors R, G and B.

The control section 104 inputs information about the amount of light emission of respective colors R, G and B acquired by the long-term color temperature correction detecting section 138 as one example of the light emission quantity detecting section of the present invention, and calculates light emitting time of the organic EL elements in the panel 158 using the input amount of light emission. The control section 104 calculates the correction coefficients Cr', Cg' and Cb' for correcting the video signals corresponding to respective colors R, G and B input into the long-term color temperature correcting section 124 based on the calculated light emitting time.

The control section 104 includes a light emitting time calculating section 162, a light emitting time memory section 164, a luminance acquiring section 166 and the coefficient calculating section 168. The constitution of the control section 104 according to one embodiment of the present invention is described below.

The light emitting time calculating section 162 calculates the light emitting time of the organic EL elements from the information about the light emission amount of the organic EL elements input from the long-term color temperature correction detecting section 138. The information about the calculated light emitting time is sent to the light emitting time memory section 164.

The light emitting time memory section 164 temporarily stores the light emitting time calculated by the light emitting time calculating section 162, and records the stored light emitting time in the recording section 106 with predetermined intervals. The recording section 106 is one example of the light emitting time recording section according to the present invention.

The luminance acquiring section 166 acquires luminance using the information about the light emitting time recorded in the recording section 106. The acquired luminance of respective colors R, G and B is sent to the coefficient calculating section 168.

The coefficient calculating section 168 calculates the correction coefficients Cr', Cg' and Cb' using the luminance acquired by the luminance acquiring section 166, and sends the calculated correction coefficients Cr', Cg' and Cb' to the long-term color temperature correcting section 124.

In order to calculate the correction coefficients Cr', Cg' and Cb', the coefficient calculating section 168 calculates them based on information about a relationship between the light emitting time and the luminance of the organic EL elements (LT property) which is recorded in the recording section 106 in advance. The information about the LT property of the organic EL elements recorded in the recording section 106 may be stored in a format of a lookup table (LUT), for example.

Figure 5:
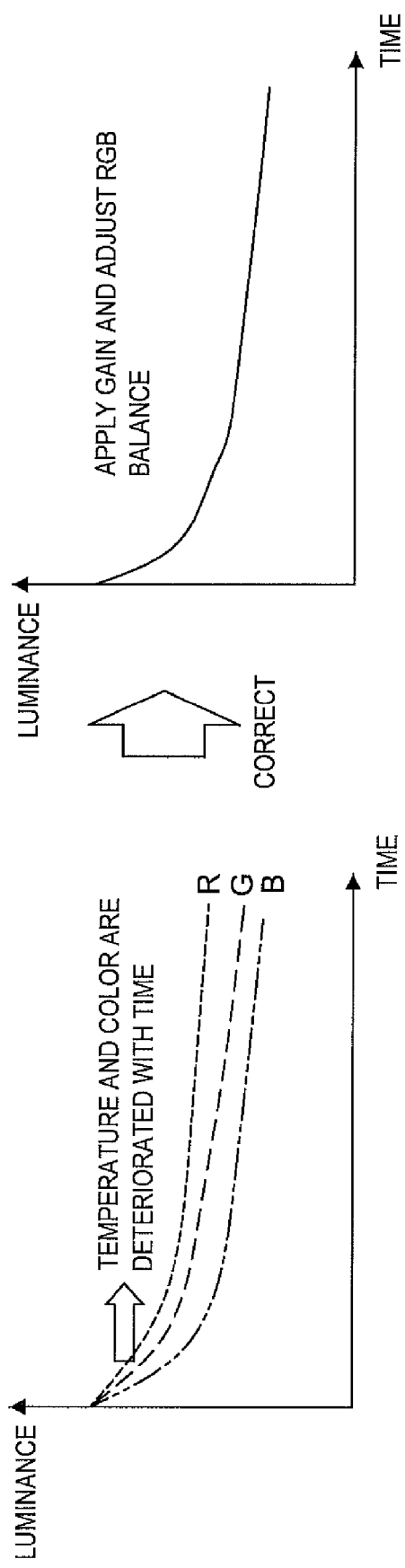
FIG. 5 is an explanatory diagram explaining one example of the LT property of the organic EL element.

FIGS. 4 and 5 are explanatory diagrams explaining examples of the LT property of the organic EL elements. As shown in FIG. 4, the general organic EL elements do not have uniform LT properties of respective colors R, G and B, but have LT properties which vary according to respective colors R, G and B. In the LT property shown in FIG. 4, deterioration in the luminance progresses over the light emitting time in an order of respective colors R, G and B.

Therefore, in FIG. 4, since the luminance of the light emitted from the organic EL elements can be acquired based on the light emitting time, the coefficient calculating section 168 calculates the correction coefficients (gains) based on the luminance information acquired from the light emitting time according to a color whose luminance is the lowest.

In this embodiment, the information about the LT properties of the organic EL elements shown in FIG. 4 are stored in the recording section 106 in advance. As shown in left side of FIG. 5, the light emitting time is derived from the amount of light emission corresponding to the respective colors input into the control section 104. The luminance acquiring section 166 acquires the luminance information corresponding to respective colors R, G and B based on the derived light emitting time using the information about the LT properties stored in the recording section 106. The coefficient calculating section 168 calculates the gains for correcting the levels of the video signals using the luminance information of respective colors R, G and B acquired by the luminance acquiring section 166. In order to repress the deterioration of the organic EL elements, the gains are desirably calculated according to any one of the colors R, G and B whose luminance is the lowest.

When the correction coefficients are calculated in such a manner, an image can be displayed without deteriorating its white balance. As shown in right side of FIG. 5, since the gains are calculated so that the luminance of the other colors are adjusted to the lowest luminance of one color, the deterioration in the organic EL elements can be repressed.

The constitution of the control section 104 according to one embodiment of the present invention is described above.

The long-term color temperature correction detecting section 138 inputs the video signals and calculates the luminance of respective colors R, G and B based on the input video signals. In this embodiment, the luminance of one color is calculated using the video signal for one frame. That is to say, in order to calculate the luminance of three colors R, G and B, the video signals for three frames are input.

Figure 6:
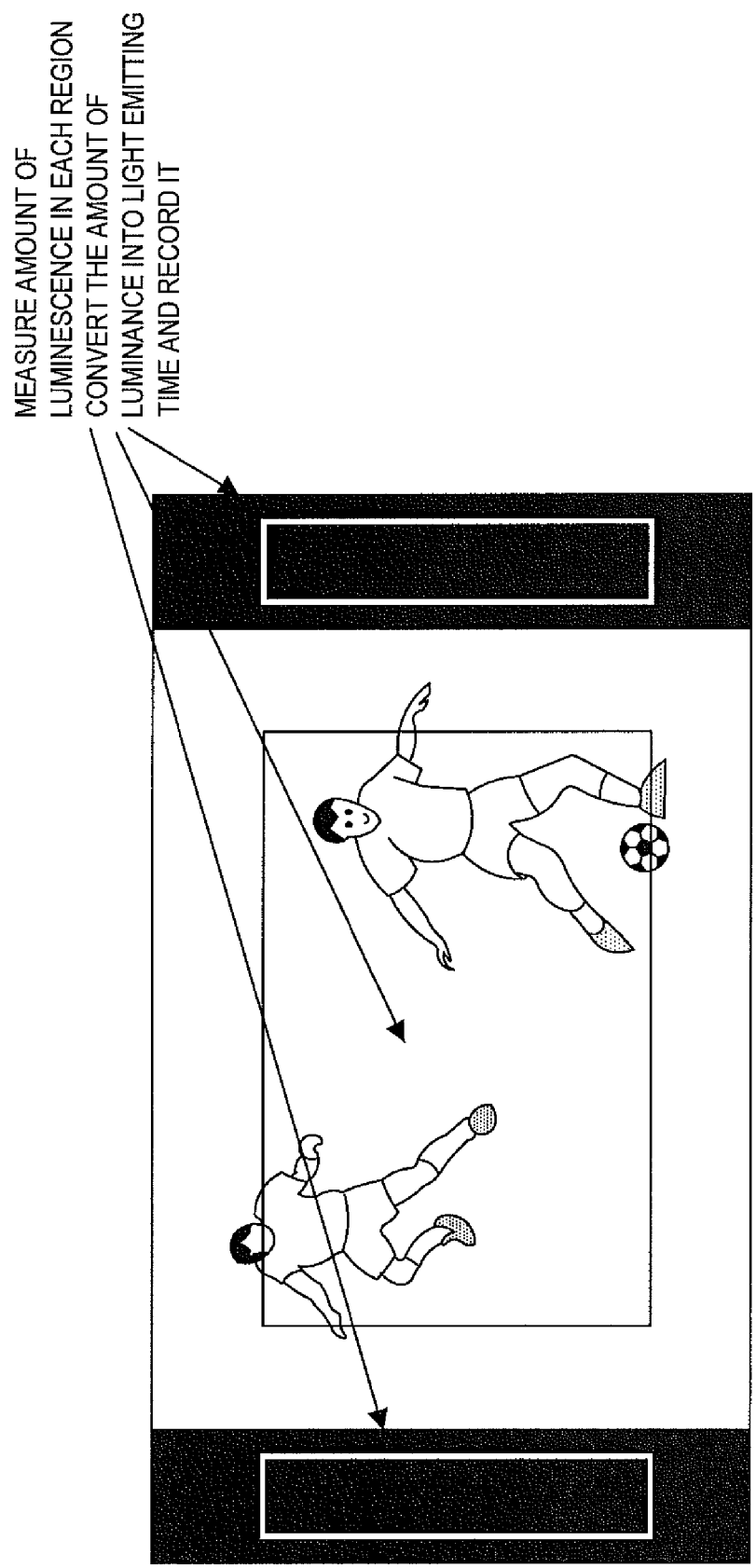
FIG. 6 is an explanatory diagram illustrating a region on a screen divided in order to acquire luminance according to one embodiment of the present invention.

The long-term color temperature correction detecting section 138 divides the screen into a plurality of regions, and calculates average luminance in each region. FIG. 6 is an explanatory diagram illustrating the regions on the screen divided for the calculation of the luminance.

As shown in FIG. 6, in this embodiment, the long-term color temperature correction detecting section 138 divides the screen into three regions, calculates the amount of light emission of R, G and B in the respective regions, so as to send the calculated amount of light emission to the control section 104. The control section 104 acquires the light emitting time based on the amount of light emission of the respective colors in the respective regions.

When the average luminance of the respective colors in each region is calculated in such a manner, the gains are calculated for not only respective colors R, G and B but also the respective regions in the coefficient calculating section 168 so that the color temperature can be corrected.

In this embodiment, the screen is divided into a plurality of regions, and the average luminance in each region is calculated. However, the present invention is not limited to this, and the luminance is calculated per pixel, and the color temperature may be corrected based on the luminance calculated per pixel.

The long-term color temperature correcting section 124 and the structural components relating to the long-term color temperature correcting section 124 according to one embodiment of the present invention is described above. A color temperature correcting method according to one embodiment of the present invention is described below.

Video signals are input into the long-term color temperature correction detecting section 138. The video signal input into the long-term color temperature correcting section 138 are videos signals which have passed through the signal level correcting section 128 and are a source of a video actually displayed on the panel 158.

When video signals are input into the long-term color temperature correction detecting section 138, the amount of light emission of respective colors R, G and B is calculated per region based on the video signals.

Since the long-term color temperature correction detecting section 138 can acquire the luminance of one color based on the video signal for one frame, video signals for three frames are used for acquiring the luminance of the three colors R, G and B. In this embodiment, since the screen is divided into three regions and an average value of the luminance of the respective colors in each region is calculated, video signals for nine frames are input in order to acquire average values of all the colors in all the regions.

The organic EL elements establish a linear relationship between an amount of electric currents to be input and the amount of light emission as described above. Further, the organic EL elements have a linear relationship between the electric current and the voltage. Therefore, when the levels of the video signals (voltage values) are detected, the amount of light emission according to the signal levels can be acquired.

The long-term color temperature correction detecting section 138 calculates the average amount of light emission in each region, and sends the calculated average amount of light emission to the control section 104. The control section 104 acquires light emitting time from the information about the average amount of light emission in each region and records it in the recording section 106 so as to calculate the correction coefficients Cr', Cg' and Cb' based on the information about the accumulated light emitting time of the respective colors in the organic EL elements.

In this embodiment, the correction coefficients Cr', Cg' and Cb' are calculated by using the information about the LT property of the organic EL elements recorded in the recording section 106. The use of the information about the LT property of the organic EL elements enables the luminance of the organic EL elements to be derived based on the information about the light emitting time of respective colors R, G and B in each region. The correction coefficients for correcting the video signals are calculated based on the derived luminance of organic EL elements.

In this embodiment, the calculated light emitting time is quantized. The quantized light emitting time is temporarily stored with any interval (for example, interval of 1 minute), and the light emitting time is recorded in the recording section 106 with another any interval (for example, interval of 1 hour). The luminance acquiring section 166 acquires the luminance levels of the respective colors R, G and B from the information about the light emitting time recorded in the recording section 106.

When the luminance acquiring section 166 acquires the luminance levels of respective colors R, G and B, the coefficient calculating section 168 calculates the correction coefficients Cr', Cg' and Cb' for correcting the signal levels of the video signals.

The correction coefficients Cr', Cg' and Cb' calculated by the coefficient calculating section 168 are sent from the control section 104 to the long-term color temperature correcting section 124. The coefficient multiplying section 170 multiplies the video signals by the correction coefficients Cr', Cg' and Cb' calculated by the coefficient calculating section 168, so that the long-term color temperature correcting section 124 corrects the levels of the video signals.

The coefficient calculating section 168 detects the lowest luminance level in the luminance levels of the correction coefficients Cr', Cg' and Cb', namely, respective colors R, G and B, and calculates gains such that the luminance levels of the other colors are adjusted to the lowest luminance level of the color. For example, when the luminance level of R in the acquired luminance levels of respective colors R, G and B is the lowest, gains such that the luminance levels of G and B are adjusted to the luminance level of R are calculated.

Figure 7:
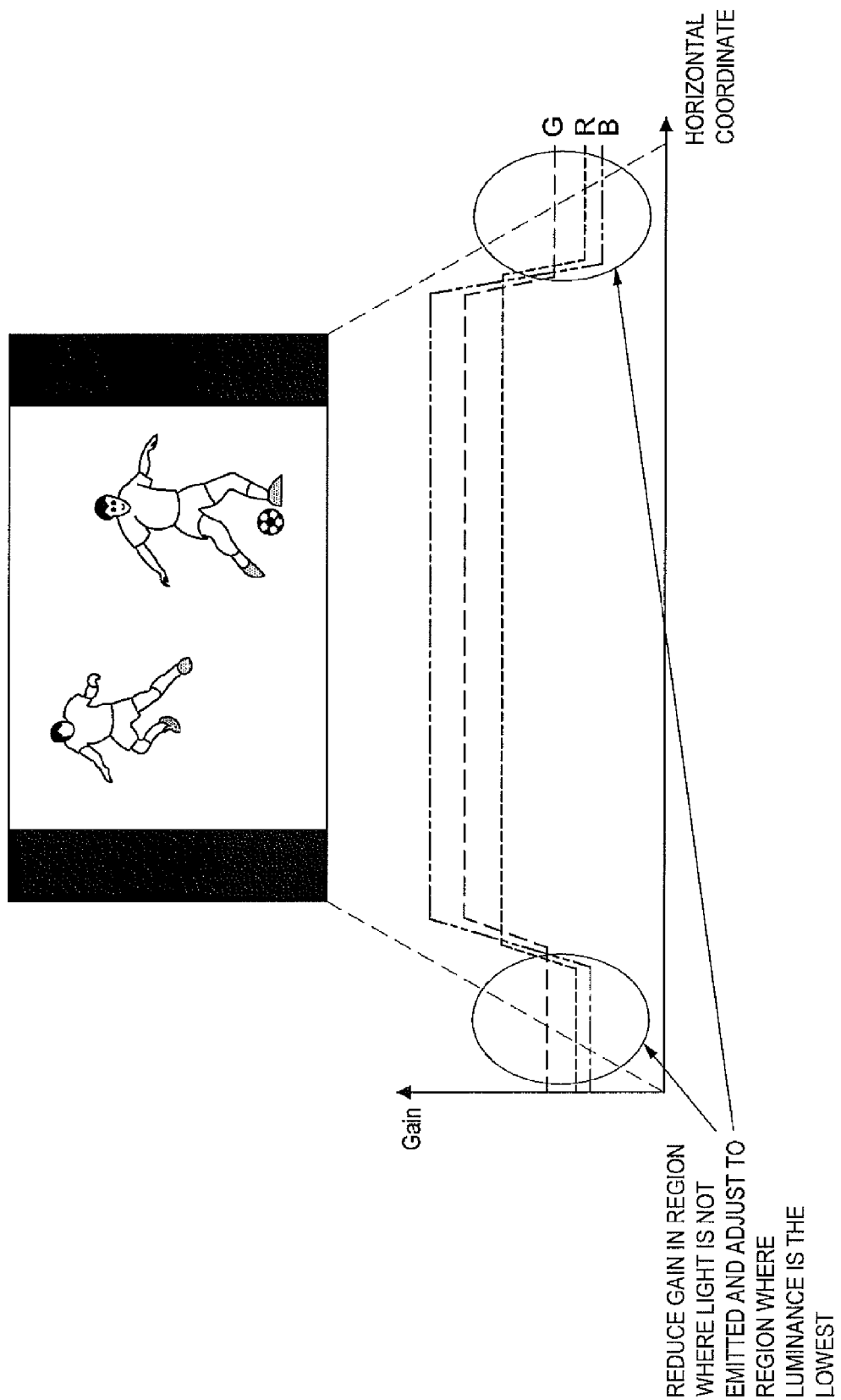
FIG. 7 is an explanatory diagram illustrating a graph of a relationship between a horizontal coordinate on the screen and a gain according to one embodiment of the present invention.

FIG. 7 is an explanatory diagram illustrating a graph of a relationship between a horizontal coordinate and a gain of the screen according to one embodiment of the present invention. As shown in FIG. 7, gains in regions where light is not emitted are reduced so as to be adjusted to the region having the lowest luminance.

The calculated gains are sent from the coefficient calculating section 168 to the coefficient multiplying section 170. The coefficient multiplying section 170 multiplies components of respective colors R, G and B of the video signals by the gains, so as to correct the signal levels.

The color temperature correcting method according to one embodiment of the present invention is described concretely with reference of the drawings.

Figure 8:
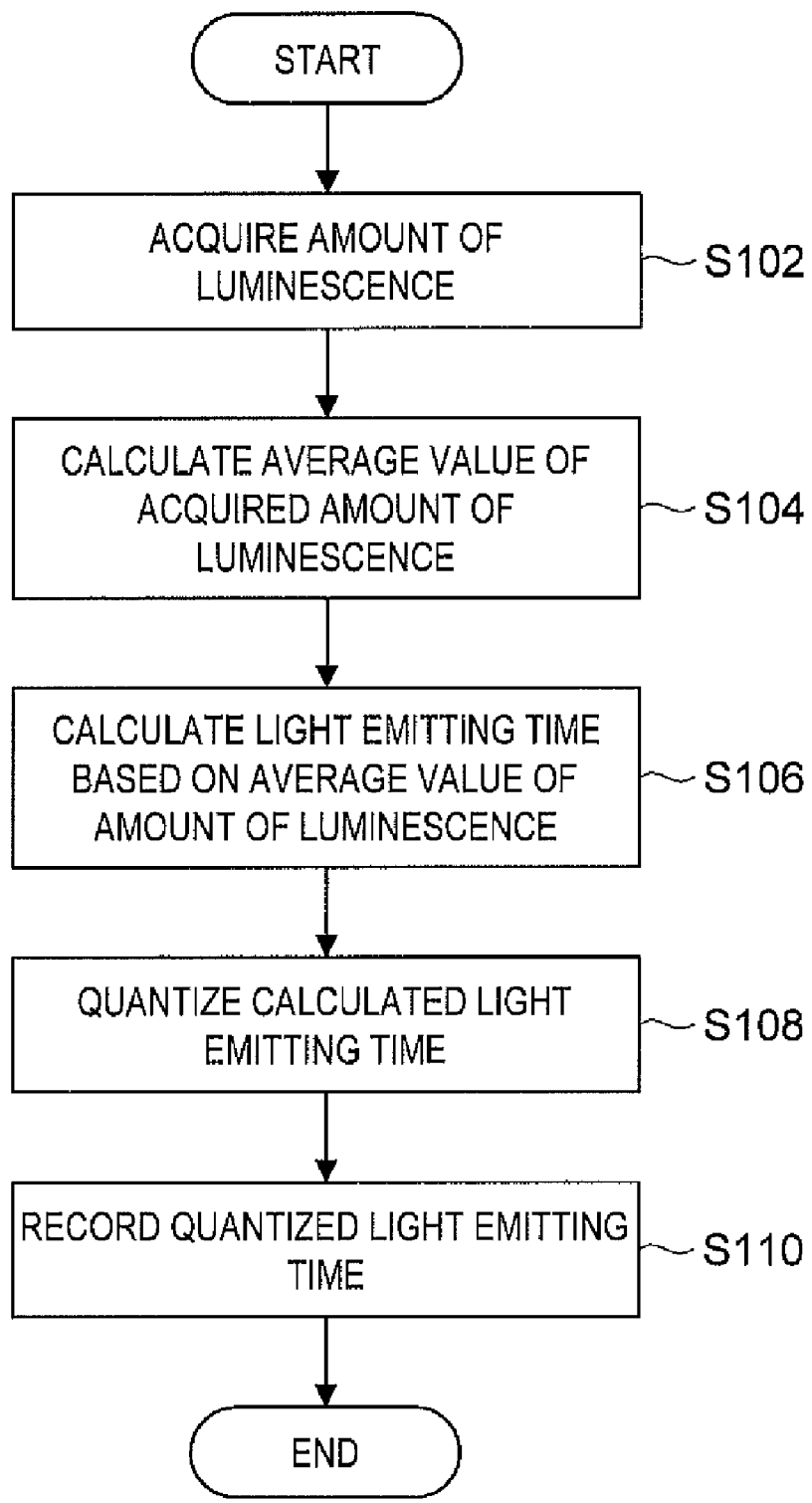
FIG. 8 is a flow chart explaining a color temperature correcting method according to one embodiment of the present invention.
Figure 9:
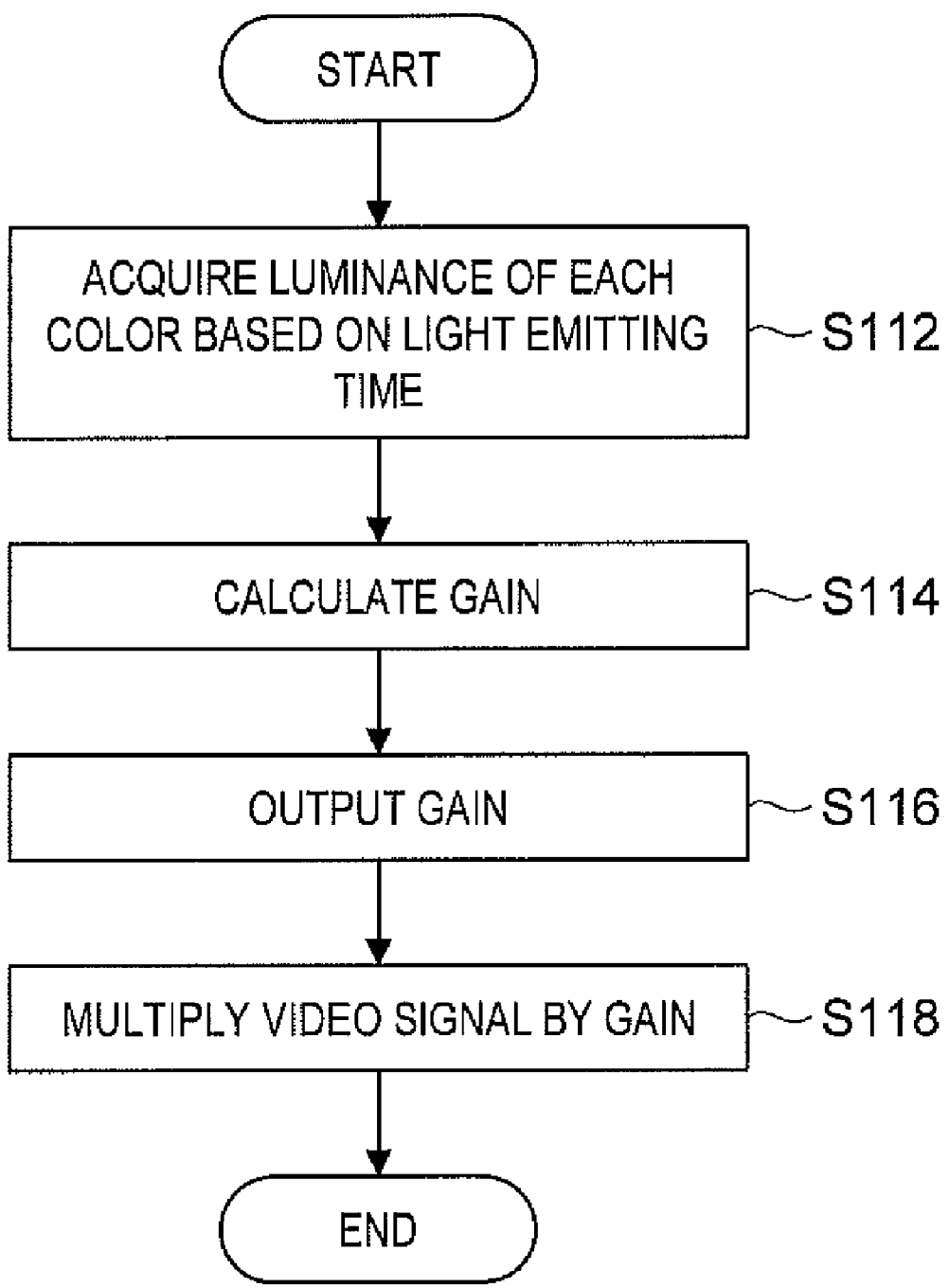
FIG. 9 is a flow chart explaining the color temperature correcting method according to one embodiment of the present invention.

FIGS. 8 and 9 are flow charts explaining the color temperature correcting method according to one embodiment of the present invention. FIG. 8 is a flow chart explaining the flow from the acquisition of the light emitting amount to the recording of the light emitting time. FIG. 9 is a flow chart explaining the flow from the acquisition of the luminance of the light emitting time to the multiplication of the video signals by the gains.

When the video signals are input into the long-term color temperature correction detecting section 138, it acquires the light emission amount of respective colors R, G and B from the input video signals (step S102). Since the long-term color temperature correction detecting section 138 can acquire the luminance of one color from the video signal for one frame, video signals for three frame are used for acquiring the luminance of three colors R, G and B.

After the video signals for three frames are input and data about the light emitting amount of one set of colors R, G and B are acquired, the data about the light emission amount of a next set colors R, G and B may be continuously acquired, or may be acquired with predetermined interval.

In this embodiment, after the data about the light emission amount of one set of R, G and B is acquired, the data about the light emission amount of next set of R, G and B is acquired with time interval of three frames. Therefore, the interval with which the data about the light emission amount is acquired is 6 V time (=0.1 second). Therefore, the 600 sets of the data about the light emission amount are acquired for 1 minute.

When the long-term color temperature correction detecting section 138 acquires a predetermined number of data about the light emission amount, the data about the light emission amount are sent from the long-term color temperature correction detecting section 138 to the control section 104 via the I/F section 114. The light emitting time calculating section 162 receives the data about the light emission amount, and calculates the average value of the light emission amount acquired by the light emitting time calculating section 162 (step S104).

In this embodiment, when the data about the light emission amount is acquired for one minute, namely, 600 sets of the data about the light emission amount are acquired, the average amount of the light emission for 1 minute is calculated by using the 600 sets of the data about the light emitting amount.

When the light emitting time calculating section 162 calculates the average light emission amount, it calculates the light emitting time based on the calculated average light emission amount (step S106). In this embodiment, the light emitting time is calculated based on the average light emission amount in one minute. The light emitting time can be calculated according to the following formula.

Light emitting time=average light emission amount÷reference value

The reference value in this embodiment is a value corresponding to 200 cd/m2 (in overall white) and becomes 64 when a duty is 25%.

When the light emitting time is calculated, the calculated light emitting time is recorded in the recording section 106. In order to record it into the recording section 106, the calculated light emitting time is quantized (step S108). At the time of the quantization, in order to record values by 15 seconds in the case where an integer part is set as "minute" and a decimal part is set as "second", the light emitting time is made fourfold, so that the fractional part is truncated.

When the light emitting time is made to be fourfold and the fractional part is truncated, the light emitting time can be recorded in the recording section 106 with high accuracy. The present invention is not limited to this, and the light emitting time is subject to no processes and may be recorded directly in the recording section.

When the light emitting time is quantized, the quantized light emitting time is recorded in the recording section 106 (step S110). The recording in the recording section 106 may be carried out every time of the quantization, or the quantized light emitting time may be stored temporarily so as to be stored in the recording section 106 with predetermined time interval.

When the light emitting time is recorded every time of the quantization, the number of recording times is likely to exceed the limit number of rewriting times of the memory according to some specifications of a memory adopted as the recording section 106. In this embodiment, after the case of adopting such a memory as the recording section 106 is taken into consideration, the quantized light emitting time is temporarily stored in the light emitting time memory section 164. It is desirable to record the light emitting time in the recording section 106 from the light emitting time memory section 164 with an interval longer than an interval of calculating the average light emission amount. In this embodiment, the light emitting time is recorded in the recording section 106 from the light emitting time memory section 164 with interval of 1 hour. Needless to say, in the case where the number of rewriting times in the recording section 106 is not limited, the light emitting time may be recorded in the recording medium 106 directly from the light emitting time calculating section 162.

At the time of recording in the recording section 106, the light emitting time is not overwritten but is accumulated so as to be saved therein. The information about the light emitting time recorded in the recording section 106 is read, and is added to the information about the light emitting time which is quantized or quantized to store for a constant time. The added information about the light emitting time is recorded in the recording section 106.

When the information about the light emitting time is accumulated in the recording section 106, the luminance of the respective colors of the organic EL elements can be derived by using the information about the light emitting time and the information about the LT property. Therefore, the luminance acquiring section 166 derives the luminance of the respective colors of the organic EL elements using the information about the light emitting time accumulated in the recording section 106 (step S112).

When the luminance acquiring section 166 derives the luminance of the respective colors of the organic EL elements, it sends the derived luminance of the respective colors to the coefficient calculating section 168. The coefficient calculating section 168 calculates the correction coefficients based on the luminance of the respective colors (step S114), and outputs the calculated correction coefficients to the long-term color temperature correcting section 124 (step S116). When the long-term color temperature correcting section 124 receives the correction coefficients, the coefficient multiplying section 170 multiplies the components of respective colors R, G and B of the video signals by the correction coefficients calculated by the coefficient calculating section 168 so as to correct the signal levels (step S118).

The luminance levels of respective colors R, G and B acquired from the light emitting time of the organic EL elements derived by the luminance acquiring section 166 are denoted by Yr, Yg and Yb, respectively. Since service life curves of respective colors R, G and B and the light emitting time of respective colors R, G and B are different from one another, Yr, Yg and Yb have different values.

Therefore, the lowest luminance level in the luminance levels of Yr, Yg or Yb of R, G or B is calculated, and the correction coefficients for correcting the luminance levels so that the luminance levels of the other colors are adjusted to the lowest luminance level of that color are calculated.

$Y\min=\min(Yr,Yg,Yb)$ $Cr'=Y\min/Yr$ $Cg'=Y\min/Yg$ $Cb'=Y\min/Yb$

The light emitting time is calculated from the information about the light emission amount, and the luminance levels of respective colors R, G and B are acquired from the calculated light emitting time. When the correction coefficients for adjusting the luminance levels of respective colors R, G and B to one another are calculated so that the color temperature can be corrected.

Figure 10B:
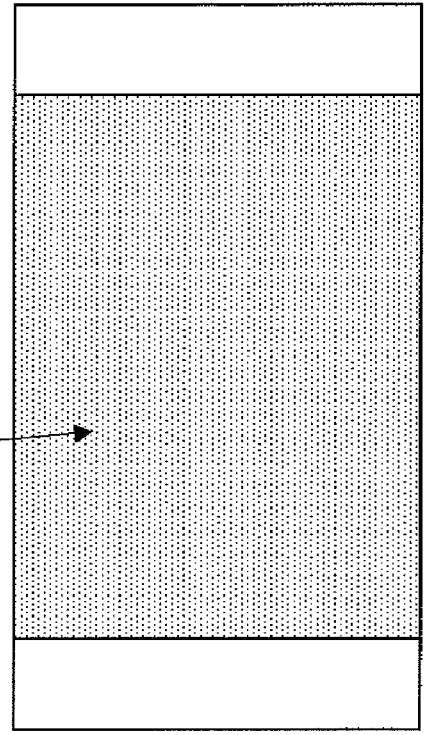
FIG. 10B is an explanatory diagram explaining the adjustment of color temperature according to one embodiment of the present invention.
Figure 10A:
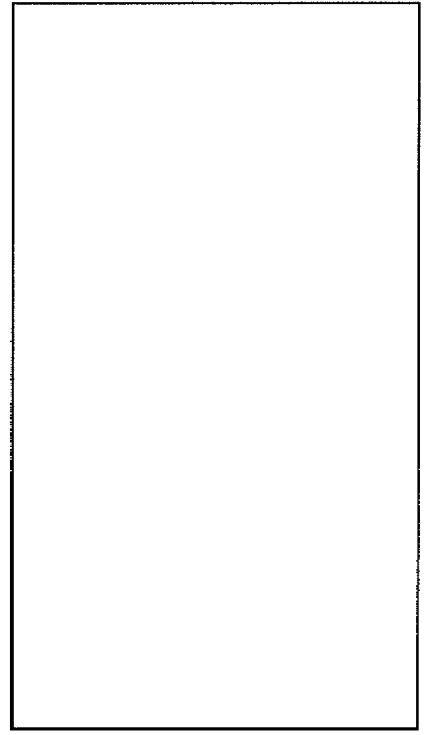
FIG. 10A is an explanatory diagram explaining adjustment of color temperature according to one embodiment of the present invention.

FIGS. 10A and 10B are explanatory diagrams explaining the adjustment of the color temperature according to one embodiment of the present invention.

As shown in FIG. 10A, the display device 100 according to this embodiment can display a video with an aspect ratio of 16:9 (960 dots in a horizontal direction, 540 dots in a vertical direction) on the panel. However, videos with an aspect ratio of 4:3 are still present in television broadcasting. When such videos are displayed on the display device 100 according to this embodiment, the videos are displayed on only the center portion, but no video is displayed on both right and left end portions of the screen, namely, black is displayed.

Therefore, as shown in FIG. 10B, when a video with aspect ratio of 4:3 is continuously displayed on the display device 100, the center portion is particularly deteriorated in comparison with both the end portions where black is displayed.

When a video with aspect ratio of 4:3 is continuously displayed on the display device 100 and the light emitting property of the center portion is deteriorated, the luminance of both the right and left end portions of the screen may be corrected so as to be adjusted to the luminance of the center portion, or the luminance of the entire screen may be corrected so that the luminance of the center portion of the screen is adjusted to the luminance of a color with the lowest luminance level.

In this embodiment, the detecting region on the screen at the time of detecting the light emission amount is vertical 512 lines ($512=2^9$). On the other hand, the detecting region has vertical 540 lines on the panel. Therefore, when the light emission amount is detected, the detecting region may be moved up and down as time passes.

Figure 11:
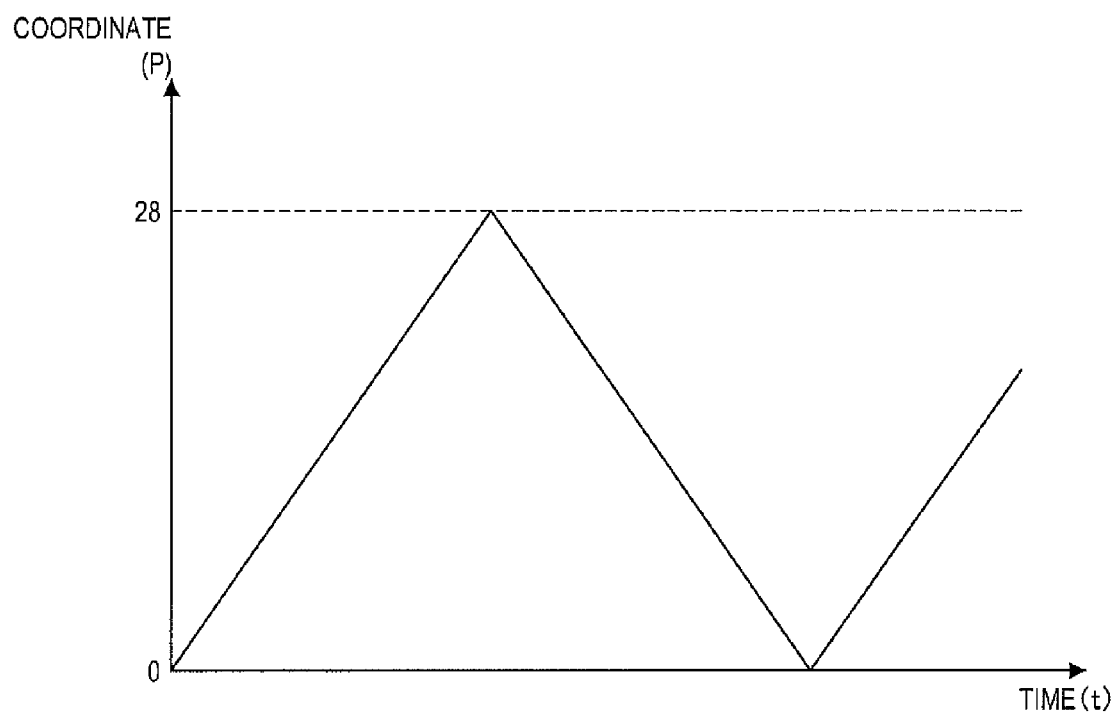
FIG. 11 is an explanatory diagram illustrating a graph of a relationship between time and detecting regions according to one embodiment of the present invention.

FIG. 11 is an explanatory diagram illustrating a graph of a relationship between the time and the detecting region according to one embodiment of the present invention. An abscissa axis represents time (t), and an ordinate axis represents a coordinate of a starting line at the upper end of the detecting region based on the top of the panel.

When time (t) is 0, the vertical 512 lines from the top on the panel are used as the detecting region, and the amount of light emission is detected. Therefore, the upper end of the detecting region is gradually lowered as time passes, and when the upper end of the detecting region reaches the 28-th line, the upper end of the detecting region is gradually lowered. When the detecting region is moved up and down as time passes, the amount of light emission on the entire screen can be acquired uniformly.

An inclination of a straight line on the graph shown in FIG. 11, namely, a moving amount of the detecting region per time may be a fixed value or a variable value. In the case of a variable value, the moving amount may be released as a parameter in order to enable setting from the outside.

The color temperature correcting method according to one embodiment of the present invention is described above. The color temperature correcting method according to one embodiment of the present invention may be executed in such a manner that a computer program, which is created in order to execute the color temperature correcting method according to one embodiment of the present invention, is recorded in a recording medium (for example, the recording section 106) in the display device 100 in advance, and this computer program is sequentially read by an operating device (for example, the control section 104).

According to one embodiment of the present invention, the light emission amount of the organic EL elements is acquired from the video signals, the light emitting time is calculated from the acquired light emission amount, and the luminance levels of respective colors R, G and B can be calculated from the information about the calculated light emitting time. Gains are calculated based on a color with the lowest luminance level in the calculated luminance levels of respective colors R, G and B, and the color temperature is corrected by multiplying the video signals by the calculated gains. As a result, the deterioration in the white balance of an image displayed on the screen through the panel in the display device 100 can be prevented.

According to one embodiment of the present invention, since the luminance levels of respective colors R, G and B can be calculated from the levels of the video signals having linear property, even if the information about the luminance levels of respective colors R, G and B emitted actually from the panel 158 is not acquired, the luminance levels of respective colors R, G and B are acquired so that the color temperature can be corrected. Since the various signal process to be executed on the video signal having linear property may be simple operations, and thus a simple configuration is enough for the circuits which perform the operations. As a result, the entire area of the circuits is reduced, and, therefore, the display device 100 is thinned and light-weighted.

It should be understood by those skilled in the art that various modifications, combinations, sub-combinations and alternations may occur depending on design requirements and other factors insofar as they are within the scope of the appended claims or the equivalents thereof.

For example, in this embodiment, the luminance acquiring section 166 provided into the control section 104 acquires the luminance based on the light emitting time and LUT recorded in the recording section 106, and the coefficient calculating section 168 calculates the correction coefficients Cr', Cg' and Cb' from the acquired luminance. When the calculated correction coefficients are sent to the long-term color temperature correcting section 124, the coefficient multiplying section 170 provided into the long-term color temperature correcting section 124 multiplies the video signals by the coefficients. However, the present invention is not limited to this example. For example, in the control section 104, the luminance levels of respective colors R, G and B are acquired, and the acquired luminance levels are sent to the long-term color temperature correcting section 124. The long-term color temperature correcting section 124 may calculate the correction coefficients Cr', Cg' and Cb'.

What is claimed is:

1. A display device which has a display section in which pixels which have light emitting elements for emitting light according to a current amount and pixel circuits for controlling an electric current applied to the light emitting elements according to video signals, scanning lines which supply selection signals for selecting the pixels for emitting light to the pixels in a predetermined scanning cycle, and data lines which supply the video signals to the pixels are arranged into a matrix pattern, the display device comprising:
a light emission amount detecting section configured to detect an amount of light emission from video signals;
a light emitting time calculating section configured to calculate a light emitting time of the light emitting elements based on the amount of light emission detected by the light emission amount detecting section;
a recording section configured to include (a) a section in which predetermined luminance information is stored and (b) a light emitting time recording section configured to record the calculated light emitting time;
a luminance acquiring section configured to acquire the predetermined luminance information of the light emitting elements by using the light emitting time recorded in the light emitting time recording section to retrieve the predetermined luminance information from the recording section;
a coefficient calculating section configured to calculate coefficients by which the video signals are multiplied based on the predetermined luminance information acquired by the luminance acquiring section; and
a coefficient multiplying section configured to multiply the video signals by the coefficients calculated by the coefficient calculating section.

2. The display device according to claim 1, further comprising a linear converting section which is configured to convert video signals having gamma property into the video signals having linear property.

3. The display device according to claim 1, further comprising a gamma converting section which is configured to convert output signals having linear property in the coefficient multiplying section into signals having gamma property.

4. The display device according to claim 1, wherein
the light emission amount detecting section is configured to detect the amount of light emission in a plurality of regions on the screen, and
the signal level correcting section is configured to correct the amount of light emission according to the region where luminance is the lowest.

5. The display device according to claim 4, wherein the light emission amount detecting section moves up and down so as to detect the amount of light emission.

6. A display device which has a display section in which pixels which have light emitting elements for emitting light according to a current amount and pixel circuits for controlling an electric current applied to the light emitting elements according to video signals, scanning lines which supply selection signals for selecting the pixels for emitting light to the pixels in a predetermined scanning cycle, and data lines which supply the video signals to the pixels are arranged into a matrix pattern, the display device comprising:
- a light emission amount detecting section configured to detect an amount of light emission from video signals having a linear property;
- a light emitting time calculating section configured to calculate a light emitting time of the light emitting elements based on the amount of light emission detected by the light emission amount detecting section;
- a light emitting time recording section configured to record the calculated light emitting time;
- a luminance acquiring section configured to acquire luminance information of the light emitting elements using the light emitting time recorded in the light emitting time recording section;
- a coefficient calculating section configured to calculate coefficients by which the video signals are multiplied based on the luminance information acquired by the luminance acquiring section; and
- a coefficient multiplying section configured to multiply the video signals by the coefficients calculated by the coefficient calculating section, wherein,
- the coefficient calculating section calculates coefficients for adjusting luminance of the other colors according to a luminance of a color with the lowest luminance as a result of acquiring the luminance information in the luminance acquiring section.

7. A control method for display device, the display device having a display section in which pixels which have light emitting elements for emitting light according to a current amount and pixel circuits for controlling an electric current applied to the light emitting elements according to video signals, scanning lines which supply selection signals for selecting the pixels for emitting light to the pixels in a predetermined scanning cycle, and data lines which supply the video signals to the pixels are arranged into a matrix pattern, the control method comprising the steps of:
- receiving video signals having a linear property and detecting an amount of light emission;
- calculating light emitting time based on the amount of light emission detected at the light emission amount detecting step;
- recording the calculated light emitting time in a recording section that also stores predetermined luminance information;
- acquiring the predetermined luminance information of the light emitting elements by using the calculated light emitting time to retrieve the predetermined luminance information from the recording section, said predetermined luminance information being based on a relationship between the light emitting time recorded at the light emitting time recording step and the luminance of the light emitting elements;
- calculating coefficients by which the video signals are multiplied based on the predetermined luminance information acquired at the luminance acquiring step; and
- multiplying the video signals by the coefficients calculated at the coefficient calculating step.

8. A non-transitory computer readable medium having a computer program stored thereon, said computer program, when executed, enables a computer to control a display device having a display section in which pixels which have light emitting elements for emitting light according to a current amount and pixel circuits for controlling an electric current applied to the light emitting elements according to video signals, scanning lines which supply selection signals for selecting the pixels for emitting light to the pixels in a predetermined scanning cycle, and data lines which supply the video signals to the pixels are arranged into a matrix pattern, the computer program comprising the steps of:
- inputting video signals having a linear property and detecting an amount of light emission;
- calculating light emitting time based on the amount of light emission detected at the light emission amount detecting step;
- recording the calculated light emitting time in a recording section that also stores predetermined luminance information;
- acquiring the predetermined luminance information of the light emitting elements by using the calculated light emitting time to retrieve the predetermined luminance information from the recording section, said predetermined luminance information being based on a relationship between the light emitting time recorded at the light emitting time recording step and the luminance of the light emitting elements;
- calculating coefficients by which the video signals are multiplied based on the predetermined luminance information acquired at the luminance acquiring step; and
- multiplying the video signals by the coefficients calculated at the coefficient calculating step.

* * * * *